Patented June 5, 1945

2,377,485

UNITED STATES PATENT OFFICE 2,377,485

PROCESS FOR THE PRODUCTION OF SULPHONYLGUANIDINES

Herman Eldridge Faith, Stamford, Conn., assignor to American Cyanamid Company, New York, N. Y., a corporation of Maine No Drawing. Application November 28, 1942, Serial No. 467,208

4 Claims. (Cl. 260—397.7)

This invention relates to a novel process for the production of substituted benzene sulphonyl guanidines. More particularly, it relates to a novel process for the production of sulphanilyl guanidine.

Sulphanilylguanidine is one of the outstanding chemotherapeutic agents developed in the past few years and it is extremely desirable that satisfactory commercial methods for its production be developed. In accordance with the present invention I have discovered that sulfanilylguanidine can be produced in commercial quantities by a novel process which utilizes readily available intermediates and which process can be carried out in readily available and non-expensive equipment.

The process of the present invention is based on a reaction of compounds illustrated by the following type formula with guanidine salts:

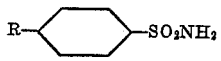

R represents an amino radical, a radical hydrolyzable to an amino group including acylamino radicals and groups reducible to an amino group including nitro radicals.

The process may be conveniently illustrated by the following equation utilizing guanidine carbonate as the guanidine salt:

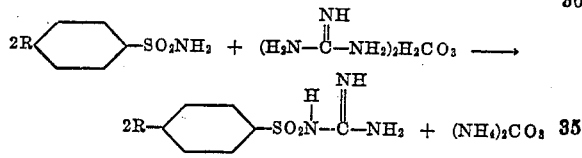

The above reaction readily occurs when the components are fused by direct heating or by heating them with a suitable solvent such as monomethylether of diethylene glycol or n-butylether of ethyleneglycol. When sulphanilamide is used as the starting material, sulphanilylguanidine is produced directly. When $N^4$-acetylsulphanilamide is utilized, acetylsulphanilylguanidine is obtained which can be subsequently hydrolyzed to sulphanilylguanidine. When p-nitrobenzenesulphonamide is employed, p-nitrobenzenesulphonylguanidine is obtained which can be reduced to sulphanilyl guanidine.

The invention will be described in greater detail in conjunction with the following specific examples which are given by way of illustration. The parts are by weight except in the case of liquids which are expressed in corresponding parts by volume.

Example 1

2.5 parts of $N^4$-acetylsulphanilamide is mixed with 1.08 parts of guanidine carbonate. The mixture is heated to 180° by a bath and maintained at 180° C. to 190° C. for one-half hour. While warm, the cake is covered with water to loosen. The mixture is then cooled and made strongly alkaline with ammonium hydroxide. After stirring for ten minutes, the insoluble material is filtered off and washed with water. When crystallized from water, pure $N^4$-acetylsulphanilylguanidine is obtained.

Example 2

1.26 parts of $N^4$-acetylsulphanilylguanidine is refluxed for five minutes with 5 parts of 12% hydrochloric acid. The solution is cooled, stirred with activated carbon and filtered. Neutralization with sodium hydroxide solution gives a white precipitate of sulphanilylguanidine. This is purified by crystallizing from water.

Example 3

3 parts of p-aminobenzene sulphonamide is mixed with 1.62 parts of guanidine carbonate and the temperature is raised by a bath to 140° C. in twenty five minutes. The mixture melts at this point and is maintained at 140° C. to 145° C. for thirty minutes. The warm cake is broken up with water and the mixture made strongly alkaline with ammonium hydroxide. The insoluble portion is filtered from the solution. Crystallizing from hot water gives pure sulphanilylguanidine.

Example 4

3 parts of $N^4$-acetylsulphanilamide and 1.32 parts of guanidine carbonate are refluxed with 25 parts of monomethylether of diethylene glycol for 1.5 hours. The solution is cooled and diluted with three times its volume of water. It is made alkaline and the precipitated product filtered off. Crystallization from water gives pure $N^4$-acetylsulphanilylguanidine.

Example 5

3 parts of $N^4$-acetylsulphanilamide and 1.32 parts of guanidine carbonate are refluxed with 25 parts of n-butylether of ethyleneglycol for 1.5 hours. The mixture is cooled and the insoluble portion is filtered off. This is suspended in water and made alkaline with ammonium hydroxide. After the solution is stirred, the insoluble material is filtered off and washed with water. This is $N^4$-acetylsulphanilylguanidine, which is purified by recrystallizing from hot water.

In the foregoing examples $N^4$-acetylsulphanilamide was employed in carrying out the reaction. The acetyl compound is preferred because of its cheapness and availability. However, it is to be clearly understood that other $N^4$-acylsulphanilamides may be used including those such as propionyl, butyryl, benzoyl, nicotinyl, and the like. Similarly, instead of guanidine carbonate, I may employ any inorganic salt of guanidine including those such as guanidine nitrate, guanidine chloride, guanidine sulphate, and the like. It is also to be understood that the alkylethers of ethylene glycol employed as solvents in certain of the examples, may be replaced by other suitable inert organic solvents boiling within the range of from about 125° to 200° C. When the reaction is carried out by direct heating of the reactants in the absence of solvents, the temperature employed will vary with the particular reagents. In general, temperatures that produce a melt but do not result in substantial decomposition are satisfactory.

The above description and examples are intended to be illustrative only and it is to be clearly understood that reasonable modifications of or variations therefrom can be made without departing from the spirit of the invention.

I claim:

1. The process of producing sulphanilylguanidine which comprises reacting p-aminobenzenesulphonamide with a guanidine salt of an inorganic acid.

2. A process according to claim 1 wherein the reaction is carried out by direct heating.

3. A process according to claim 1 wherein the reaction is carried out by heating in an inert organic solvent.

4. The process of producing sulphanilylguanidine which comprises reacting p-aminobenzenesulphonamide with guanidine carbonate.

HERMAN ELDRIDGE FAITH.